United States Patent [19]

Ham

[11] Patent Number: 5,343,628
[45] Date of Patent: Sep. 6, 1994

[54] VEHICLE REPAIR MEASURING DEVICE

[76] Inventor: Arthur E. Ham, 16218 N. 62nd Way, Scottsdale, Ariz. 85254

[21] Appl. No.: 975,402

[22] Filed: Nov. 12, 1992

[51] Int. Cl.$^5$ .............................................. G01D 21/00
[52] U.S. Cl. ........................................ 33/608; 33/288; 33/809
[58] Field of Search ................ 33/288, 809, 608, 520, 33/600

[56] References Cited

U.S. PATENT DOCUMENTS

| Re. 32,926 | 5/1989 | Colby | 33/608 |
|---|---|---|---|
| 2,000,866 | 5/1935 | Smith | 33/288 |
| 3,786,572 | 1/1974 | Larson | 33/608 |
| 3,869,804 | 3/1975 | Friend | 33/288 |
| 4,015,339 | 4/1977 | Hörvallius | 33/288 |
| 4,098,003 | 7/1978 | Negrin | 33/600 |
| 4,165,567 | 8/1979 | Olsson | 33/288 |
| 4,329,784 | 5/1982 | Björk | 33/180 |
| 4,366,624 | 1/1983 | Bergstrom | 33/288 |
| 4,386,468 | 6/1983 | Whitney | 33/180 |
| 4,490,918 | 1/1985 | Clausen | 33/288 |
| 4,573,273 | 3/1986 | Eck | 33/608 |
| 4,621,435 | 11/1986 | Higginbotham | 33/520 |
| 4,771,544 | 9/1988 | Riutta | 33/600 |
| 4,782,599 | 11/1988 | Bergstrom | 33/288 |
| 4,939,848 | 7/1990 | Armstrong | 33/608 |
| 4,958,439 | 9/1990 | Dehn | 33/608 |
| 5,193,288 | 3/1993 | Stifnell | 33/608 |

OTHER PUBLICATIONS

Advertisement of Telescopic Measuring Bridge DF-3, Dent Fix Corporation, El Segundo, CA. No Date.
Promotional brochure, Continental Collision Repair Systems of Alexandria, MN, copyright dated 1987 No Month.
Dimension III promotional brochure, Chief Automotive Systems Inc., Grand Island, NB, copyright dated 1985. No Month.
Advertisement "AUTOROBOT", Autorobot Finland KY of Kuopio, Finland, No Date.
Advertisement "GForce-2000", Grabber Manufacturing Co., Inc. of Brunswick, GA. No Date.
Promotional brochure COMS 2000, Continental Manufacturing, Inc. of Alexandria, MN, copyright dated 1990. No Month.

*Primary Examiner*—Thomas B. Will
*Attorney, Agent, or Firm*—Cahill, Sutton & Thomas

[57] ABSTRACT

A vehicle measuring device used in repairing damaged vehicle bodies includes a cross bar secured to opposing sides of the vehicle, and a tram bar having a first end adapted to be pivotally secured to the center point of the cross bar. The second end of the tram bar includes a probe for contacting various symmetrically-disposed points on either side of the vehicle body. The cross bar is supported by standards bolted to the cowl of the vehicle, the height of each standard being adjustable. The length of the tram bar is also adjustable for reaching different points on the vehicle body. Levels are provided on the cross bar and tram bar to ensure that they are horizontal. Pivot pins are also provided at each standard directly above the cowl bolts for allowing the tram bar to be pivoted therefrom. Misalignment of the vehicle body is detected by swinging the tram bar to probe points on the vehicle body that are normally equidistant from the longitudinal axis of the vehicle.

3 Claims, 3 Drawing Sheets

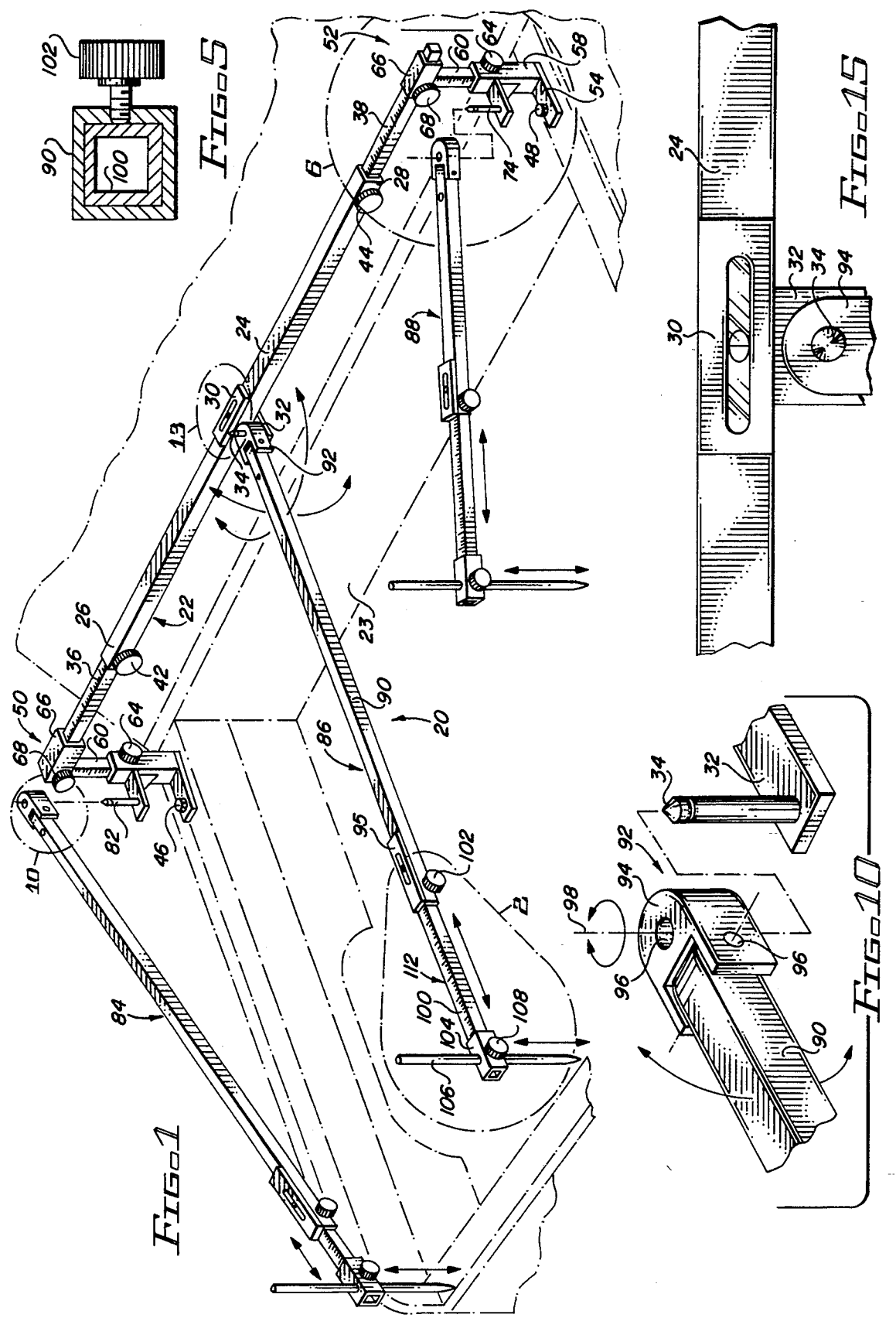

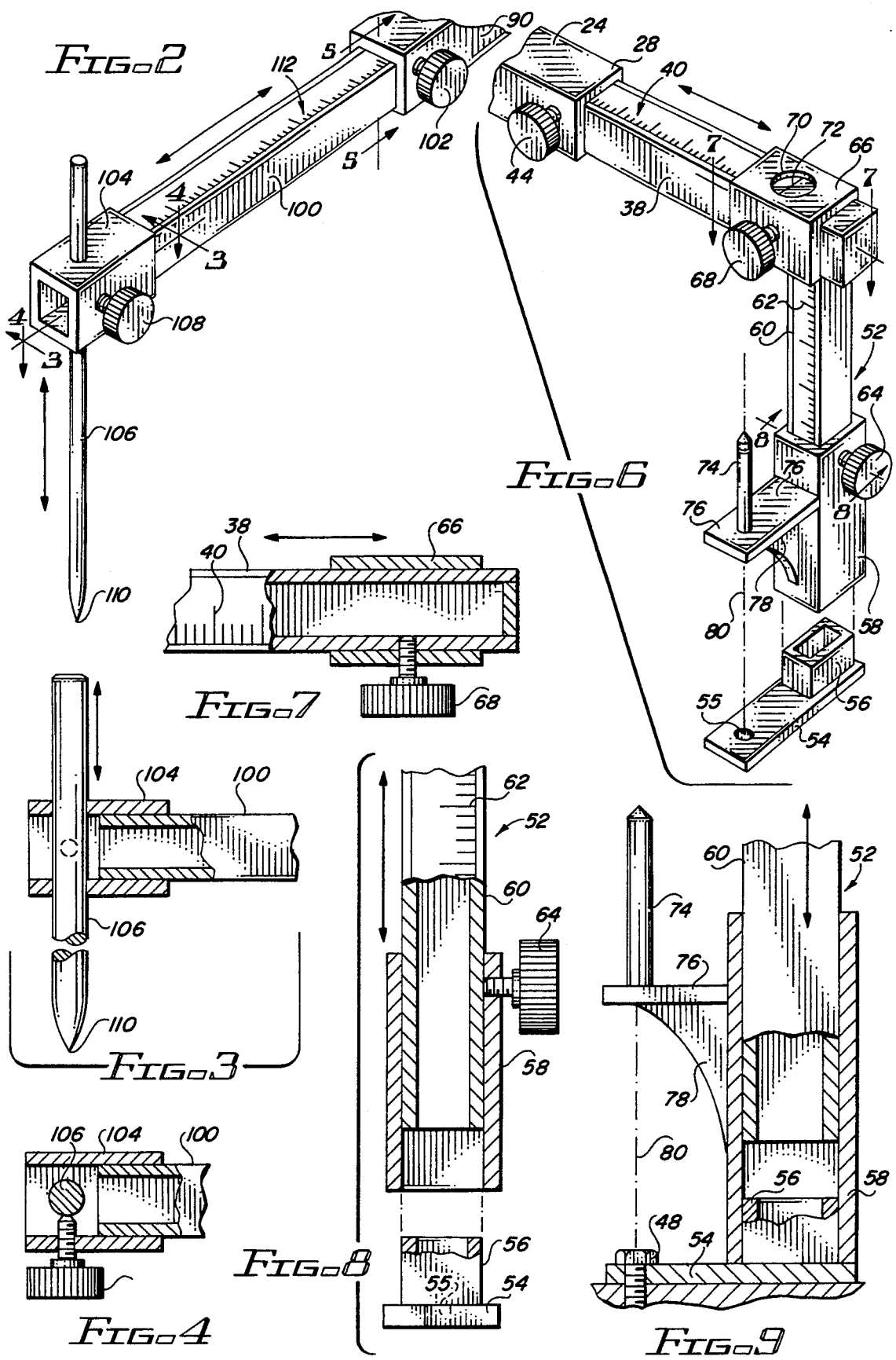

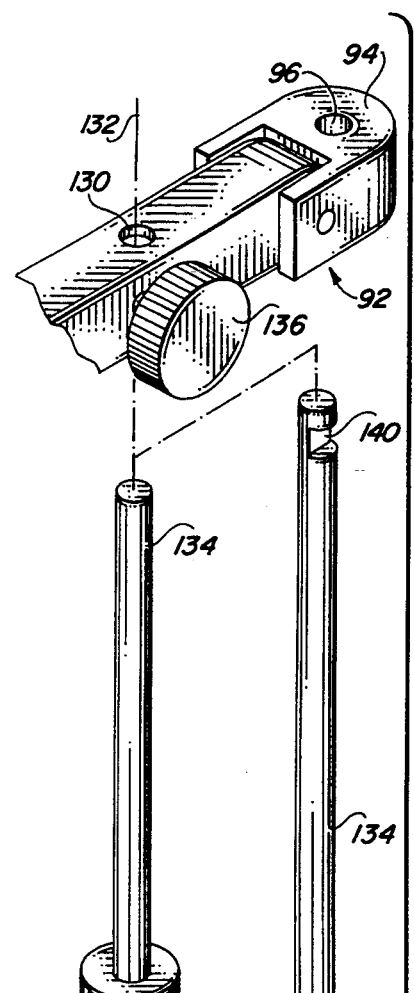
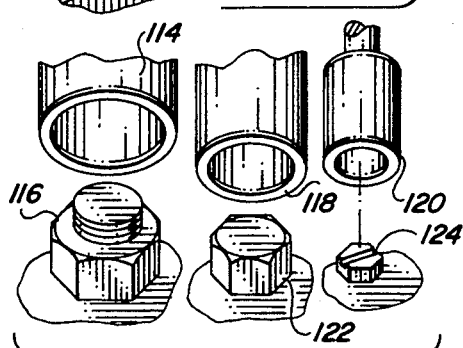
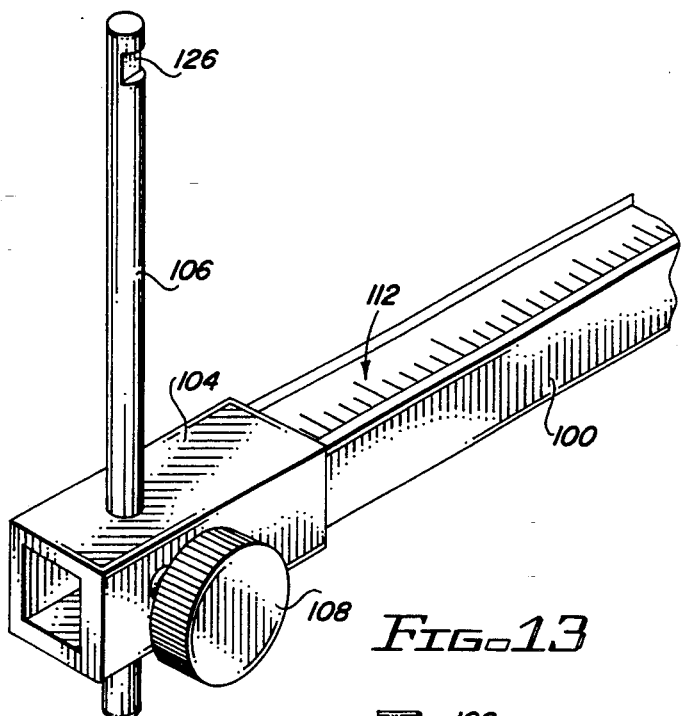
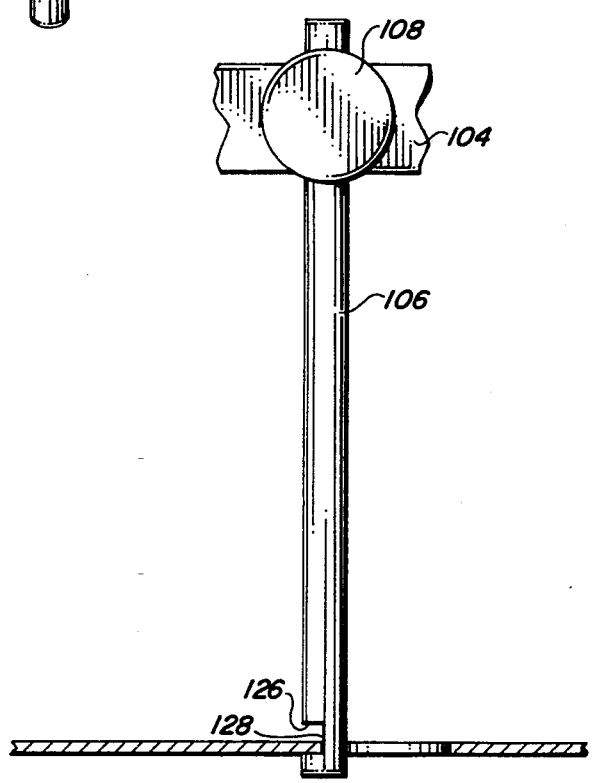

VEHICLE REPAIR MEASURING DEVICE

BACKGROUND OF THE INVENTION

1. Field of the Invention

The present invention relates generally to measuring devices used to measure vehicle bodies being repaired following collisions, and more particularly, to a vehicle repair measuring device which quickly compares distances between one or more known reference points on the vehicle body and pairs of vehicle body components that are normally equidistant from such reference points.

2. Description of the Prior Art

A variety of manufacturers supply vehicle collision repair systems for pulling vehicle body frames to return the vehicle body to proper alignment following a collision. It is particularly important for the front end of a vehicle involved in a collision to be in proper alignment to ensure proper steering and performance of the vehicle. Accordingly, pulling vehicle body frames tends to be an iterative process wherein the body is first measured to determine in which direction or directions the body has been deflected from true alignment. Once the general direction of correction is known, a first pull is made in the direction of correction, and the body is measured again to see if further correction is needed.

Many car manufacturers have adopted unibody designs for vehicles. In a unibody design, the floor, structural body components, suspension, and drive train mounting components are merged into an integral unit. Unibody construction offers increased safety to passengers within the car in the event of a collision. Collision forces are transferred throughout the unibody structure to better absorb such forces. Accordingly, if a vehicle is involved in an accident, it is important that repairs be made to restore the unibody structure to its original condition, within factory specifications, so that it can again properly absorb collision forces in the event of a second accident.

Measurements on a damaged vehicle body are often made relative to an imaginary centerline passing through the vehicle along the longitudinal axis of the vehicle. The centerline is an imaginary vertical plane running from the front to the rear of the vehicle and dividing the vehicle left to right. Manufacturers often specify measurements relative to symmetrical reference points, i.e., bolts or other vehicle components that are equidistant from the centerline. However, this centerline is, in fact, imaginary, and often, there are no convenient bolts or other reference points on the vehicle body to indicate where the centerline actually lies.

Vehicle manufacturers typically publish specifications indicating nominal distances between various components on the vehicle when the vehicle is properly aligned. For example, a car manufacturer might specify that the distance between a left front hinge bolt and a bolt located on the right front fender is 1655 millimeters, and that the distance between the right front hinge bolt and the corresponding bolt located on the left front fender is also 1655 millimeters. In this event, the body shop repairman can measure the two distances with a tram bar and see if they are equal or not. However, such dimensions are not always uniform or symmetrical. For example, a car manufacturer may specify proper under-hood dimensions relative to a windshield wiper pivot bolt that is offset from the centerline of the vehicle; in such instances, the specifications may state that the distance between the wiper pivot bolt and a bolt secured to a front left fender is 1088 millimeters, while the distance from the same wiper bolt to the corresponding bolt secured to the right front fender is 1068 millimeters.

Simple tram bars have been available to aid in making point to point measurements on the vehicle body. For example, one such tram bar is commercially available from Dent Fix Corporation of El Segundo, Calif. under the trade designation "DF-3D DigiTram". The tram bar is telescopic and digitally displays the distance between the ends of the tram bar. More commonly, such telescopic tram bars having simple ruled markings have long been used by repairman to make point to point measurements. One problem encountered by repairman when using tram bars to make measurements between pulls is that the tram bar is not supported by the vehicle, and accordingly, the tram bar must be removed from the vehicle and set aside while the repairman makes the additional pull. This process must be repeated several times and becomes a nuisance.

Car repair equipment manufacturers have devised elaborate measuring systems for use with collision repair systems in order to make measurements during the process of pulling and aligning the vehicle body. One such system is marketed by Continental Collision Repair Systems of Alexandria, Minn. under the trade designation "Universal Measuring System". Promotional literature for such system indicates that it is covered by either U.S. Pat. Nos. 4,442,608 or 4,490,918. The measuring apparatus includes a great number of support arms that extend from below the vehicle, around the sides of the vehicle, and across the top of the vehicle. While such measuring systems can permit a variety of measurements to be made once the system is erected about the car, it may take hours to initially set up the assembly of support arms around the damaged vehicle. A similar measuring system has been commercially available from Chief Automotive Systems Inc. under the trade designation "Dimension III". This system likewise employs a series of base rails, longitudinal rails, vertical rails, and upper body gages which extend about the entire vehicle and require significant set-up time. Likewise, a similar system is marketed by Autorobot Finland Ky of Kuopio, Finland under the trade designation "AUTOROBOT". In addition, Grabber Manufacturing Co., Inc. of Brunswick, Ga. markets a frame pulling apparatus for vehicles under the designation "G-Force 2000" which is available with an "Ultra-Spec 2000" measuring system which extends around the sides of the vehicle and above the vehicle to make body measurements.

U.S. Pat. No. 3,869,804 to Friend describes a vehicle frame alignment gage to straighten a vehicle to its original alignment. The apparatus is supported under the damaged vehicle and includes a number of support beams. U.S. Pat. No. 4,165,567 to Olsson discloses a similar measuring device. U.S. Pat. No. 4,015,339 to Horallius describes a telescopic measuring tool for indicating the centerline of the vehicle frame at a point offset from the frame itself. U.S. Reissue Pat. No. Re. 32,926 describes a rectangular frame gauge extending below, around, and above the front end of a damaged vehicle. Similarly, U.S. Pat. No. 4,329,784 to Bjork discloses a device for checking the dimensions of damaged vehicles, again using a series of beams extending under and around the vehicle. U.S. Pat. No. 4,386,468 describes an automobile frame aligning device including a base extending under the vehicle and a vertical support to which one or more scales are secured. U.S. Pat. No. 4,771,544 issued to Riutta describes a vehicle body measuring apparatus wherein a pair of telescoping arms are pivotally mounted on either side of the damaged vehicle from underneath the vehicle. A top bar is connected between the upper ends of the side arms, and a pair of pointers are slidably mounted on the top bar. U.S. Pat. No. 4,939,848 issued to Armstrong describes a vehicle frame alignment gauge or tram bar for use in checking the alignment of a vehicle frame. The disclosed device includes a telescoping adjustable length beam and two needle indicators; bubble levels are included on one of the beams of the device to ensure that the beam is truly horizontal or vertical. Armstrong describes placing one of the needle indicators on a bolt located on the centerline of the vehicle, extending the second needle indicator to contact one of the front bumper supports, and then rotating the tool to contact the other front bumper support. Of course, this technique will not work if there is no bolt or other component that can serve as a convenient reference point on the centerline of the vehicle body.

A computerized form of measuring system for estimating vehicle repairs is commercially available from Continental Manufacturing, Inc. of Alexandria, Minn. under the trade designation "COMS 2000". Promotional literature for such system indicates that it is covered by U.S. Pat. No. 4,473,954. The measuring apparatus includes a computer, a pointer probe accessory for pointing at a given vehicle component, a sensor stand supporting a positioning sensor responsive to the probe, and a remote transmitter for controlling the computer.

While some collision repair equipment manufacturers have opted for high technology solutions to measure the vehicle body, including computers, infrared sensors and/or lasers, such systems are expensive and are out of reach of many body shops. In addition, elaborate measuring systems can be bulky and take up significant space within a shop, where space is often at a premium. In addition, repair shops prefer measuring equipment which can quickly and easily be moved from one portion of the shop to another, and from one vehicle to another so that maximum use of such equipment can be made, and so that more vehicles can be repaired in a given amount of time.

Accordingly, it is an object of the present invention to provide a vehicle repair measuring device which is inexpensive and which quickly and easily indicates whether a vehicle which has suffered a collision has been pulled back into proper alignment.

It is another object of the present invention to provide such a measuring device which can be quickly erected for taking measurements on a vehicle, whether such vehicle is free-standing or mounted on a collision repair system, and which can be quickly removed after measurements are completed.

It is still another object of the present invention to provide such a measuring device which may be left in place while pulls are made to the vehicle body by a collision repair system.

It is a further object of the present invention to provide such a measuring device which is compact to save space in the shop, and which is easily portable for use in different portions of a repair shop.

A still further object of the present invention is to conveniently establish a centerpoint from which comparative measurements can be made between corresponding left-side and right-side components even when no convenient bolt or other reference point on the vehicle body lies on the centerline.

These and other objects of the present invention will become more apparent to those skilled in the art as the description of the invention proceeds.

SUMMARY OF THE INVENTION

Briefly described, and in accordance with a preferred embodiment thereof, the present invention relates to an measuring apparatus for measuring distances along the body of a damaged vehicle to determine whether the frame has been straightened, the measuring apparatus including a cross bar adapted to extend perpendicular to the longitudinal axis of the vehicle, the cross bar having a center pivot point midway between the opposing ends thereof. Securing means are provided for releasably securing the opposing ends of the cross bar to opposing sides of the vehicle at symmetrically-disposed attachment points that are equidistant from the longitudinal axis of the vehicle body, such as the cowl bolt mounting holes or the like.

The measuring apparatus includes at least one, and preferably several, tram bars. Each tram bar has a first end adapted to be pivotally secured to the center point of the cross bar. Preferably, a universal coupling is used for allowing the tram bar to pivot upwardly and downwardly, as well as from side to side. A bubble level may be mounted to the tram bar for indicating that the tram bar is positioned horizontally.

The second end of each tram bar includes a probe for contacting various points along the vehicle body as the tram bar is pivoted about the center point of said cross bar. The tram bar is adjustable in length, as by including an extension member telescopically received within the second end of said tram bar. A clamp is used to releasably secure the extension member for adjusting the overall length of the tram bar. The tram bar extension member is ruled in inches or millimeters to indicate the adjusted length of the tram bar from the first end pivot point to the probe.

The probe secured to the far end of the tram bar may take several forms, including a simple tapered-tip rod secured to the far end of the tram bar for contacting a portion of the vehicle body. A clamp permits the user to adjust the distance between the tapered tip of the rod and the tram bar in order to contact points of the vehicle body disposed at different heights while maintaining the tram bar level. The tip of the probe rod may take other forms, such as a cylindrical sleeve for engaging a hex-shaped bolt or nut, or a recess formed in the outer surface of the rod for engaging an edge of a sheet metal surface.

The aforementioned cross bar is preferably adjustable in length in order to fit a variety of vehicle body sizes. The cross bar includes extension members coupled to the opposing ends of the cross bar, the extension members being ruled with inch or millimeter markings to indicate the lateral distance measured across the vehicle, and to indicate the distance by which each extension member is extended. Clamps are provided at either end of the cross bar for clamping the lengths of the extension members, and hence, the overall length of the cross bar.

The support standards mentioned above each have a base for being bolted to the vehicle body, for example to the cowl bolt receiving holes. Each support standard includes a sleeve or collar for slidingly receiving an extension member proximate one end of the cross bar. A clamp is associated with each sleeve to lock the cross bar in a position wherein the center pivot point is midway between the two support standards. The ruled markings appearing on the cross bar extension members aid the user in securing the cross bar within the support standard sleeves to position the center pivot point midway between the support standard sleeves.

In order to adjust the height of the cross bar, each of the support standards includes a standard extension member telescopically received within each respective support standard; each of support standard includes a clamp for adjusting the length of each support standard, and hence, the height of the cross bar. The standard extension members are each ruled with inch or millimeter markings to indicate the adjusted height of each support standard. The cross bar preferably includes a bubble level for indicating that the cross bar extends horizontally.

In order to permit measurements to be made entirely across the engine compartment or other portion of the vehicle body, the support standards are preferably provided with pivot points that are aligned with the vertical axes that extend through the attachment points on the vehicle body; thus, if the support standard is secured to an engine cowl bolt, the pivot point for the tram bar is vertically aligned with the cowl mounting bolt. Each of the pivot points is adapted to releasably receive the first end of a tram bar for maintaining the first end of the tram bar directly over, or directly under, the vehicle body attachment point.

Another aspect of the present invention relates to a method for detecting misalignment of a damaged vehicle body, wherein a cross bar is secured at its opposing ends to symmetrically-disposed attachment points on the vehicle body perpendicular to the longitudinal axis of the vehicle. A center point is established along the cross bar for pivotally securing thereto the first end of an adjustable-length tram bar. In practicing the method, the second end of the tram bar is first swung toward a first of two symmetrically-disposed points on the vehicle body, and the length of the tram bar is adjusted and locked for allowing the second end of the tram bar to contact the first of the two symmetrically-disposed points on the vehicle body. The second end of the tram bar is then swung toward the second of the two symmetrically-disposed points on the vehicle body to determine whether the two points are equidistant from the center point. If the two points are equidistant, then those portions of the vehicle body are in alignment with each other; if not, the vehicle body is pulled by collision repair equipment, and the method is repeated to determine whether the two portions of the vehicle body have been put back into alignment with each other.

Alternatively, the aforementioned method can be practiced by establishing first and second pivot points upon the support standards directly above or below attachment points on the vehicle body. In practicing this form of the method, the first end of the tram bar is pivotally secured to the second of the pivot points, and the second end of the tram bar is swung crosswise to a first of two symmetrically disposed test points on the vehicle body. The length of the tram bar is again adjusted and locked for allowing the second end of the tram bar to contact the first of the two symmetrically-disposed test points on the vehicle body. The first end of the tram bar is then removed from the second pivot point and engaged with the opposing first pivot point. The second end of the tram bar is then swung crosswise toward the second of the two symmetrically-disposed test points on the vehicle body to determine whether the distance between the second attachment point and the first test point is the same as the distance between the first attachment point and the second test point.

BRIEF DESCRIPTION OF THE DRAWINGS

FIG. 1 is a perspective view of a vehicle repair measuring device constructed in accordance with the teachings of the present invention, and showing the engine compartment of the vehicle in dashed outline.

FIG. 2 is an enlarged view of the measuring end of a pivoting tram bar as indicated by the area in FIG. 1 encircled by dashed line 2.

FIG. 3 is a sectional view of the measuring end of the tram bar taken through lines 3—3 as shown in FIG. 2.

FIG. 4 is a sectional view of the measuring end of the tram bar taken through lines 4—4 as shown in FIG. 2.

FIG. 5 is a sectional view of the midportion of the tram bar, including a clamp for locking the telescopic measuring end of the tram bar, as taken through lines 5—5 in FIG. 2.

FIG. 6 is an enlarged perspective view of the support standard encircled within dashed circle 6 in FIG. 1.

FIG. 7 is a sectional view of an adjustable clamp securing one end of a cross bar to the sleeve of a support standard, as taken through lines 7—7 in FIG. 6.

FIG. 8 is a sectional view of the support standard taken through lines 8—8 in FIG. 6 and illustrating an adjustable clamp for adjusting the height of the support standard.

FIG. 9 is a sectional side view of the support standard shown in FIG. 6.

FIG. 10 is an enlarged perspective view illustrating the pivotal coupling between a tram bar and the center pivot pin secured to the cross bar.

FIG. 11 is a perspective view illustrating a modification of the pivoting tram bar for use as a standard tram bar, and further illustrating two alternate types of probe rods.

FIG. 12 is a partial perspective view of a series of different probe rod circular sleeves for engaging variously sized hex head bolts and hex sided nuts.

FIG. 13 is a perspective view of the measuring end of a tram bar provided with an upwardly extending probe rod adapted to engage the edge of a sheet metal surface.

FIG. 14 illustrates the same probe rod extending downwardly from the measuring end of the tram bar for engaging an edge of a sheet metal surface.

FIG. 15 is an enlarged top view of the center pivot pin on the cross bar and a universal coupling of a tram bar engaged therewith.

DETAILED DESCRIPTION OF THE PREFERRED EMBODIMENTS

A vehicle repair measuring device constructed in accordance with the teachings of the present invention is shown in FIG. 1 and is generally designated by reference numeral 20. As indicated in FIG. 1, measuring device 20 can be installed above the engine compartment 23 of the vehicle, shown in dashed outline, for making underhood measurements on the damaged vehicle. However, those skilled in the art will appreciate that use of measuring device 20 is not limited to mounting above the engine compartment, nor is it limited to making underhood measurements. Indeed, measuring device 20 may also be used to make measurements along the rear end of the vehicle, and it may be secured to the lower portion of the vehicle, as well.

As shown in FIG. 1, measuring device 20 includes a cross bar 22 adapted to extend laterally across the vehicle perpendicular to the longitudinal axis of the vehicle. Cross bar 22 includes a central member 24 preferably formed of square metal tubing measuring approximately 1000 millimeters in length, which is a length that is smaller than the width of most common vehicles. Central member 24 has a first end 26 and an opposing second end 28. A bubble level 30 is located on central member 24 approximately at the midpoint thereof to indicate whether cross bar 22 is level with the horizontal. Also extending from the center point of central member 24 midway between first end 26 and second end 28 is a horizontal flange 32; an upwardly directed pivot pin 34 extends from flange 32, and the function of such pivot pin will be described in greater detail below.

Extending from first end 26 of central member 24 is a first cross bar extension member 36 measuring approximately 500 millimeters in total length. Extension member 36 has a square cross section and is dimensioned to be slidingly received within central member 24 for being telescopically extended therefrom. A similar extension member 38 telescopically extends from second end 28 of central member 24. Thus, with both extension members 36 and 38 extended fully, the total width of cross bar 22 reaches almost 2000 millimeters, a distance exceeding the width of most common vehicles.

Referring to FIGS. 1 and 6, extension members 36 and 38 are ruled with indicia 40, preferably in inches and millimeters, to indicate the amount by which each extension member has been extended from the ends of central member 24. For example, if the repairman notes that the manufacturer's specifications call for the width of the vehicle at a certain point to be 1400 millimeters, the repairman would extend each of extension members 36 and 38 200 millimeters from ends 26 and 28, respectively, of central member 24 in preparation for the installation of cross bar 22 on the vehicle. A rotatable knob 42 is provided adjacent first end 26 of central member 24 to releasably clamp extension member 36 in place; similarly, rotatable knob 44 is provided adjacent second end 28 of central member 24 in order to releasably clamp extension member 38 in place at a desired degree of extension.

Means are provided for releasably securing the opposing ends of cross bar 22 to opposing sides of the vehicle at first and second attachment points. Any two attachment points that are equidistant from the longitudinal axis or centerline of the vehicle body may be used. Preferably, the two attachment points should lie in an axis perpendicular to the longitudinal axis of the vehicle body. The cowl bolts ordinarily used to secure the front hood hinge to the engine compartment commonly serve such purpose. In FIG. 1, such cowl bolts are designated as 46 and 48.

As shown in FIG. 1, the means used to secure cross bar 22 to the vehicle body may include a pair of support standards generally designated by reference numerals 50 and 52. As shown best in FIGS. 6, 8 and 9, support standard 52 includes a base 54 having a bolt hole 55 formed therein for permitting a cowl bolt or other bolt to be extended therethrough in order to secure the base to the vehicle body, as indicated in FIG. 1. As shown in FIG. 6, a short section of square tubing 56 is welded to base 54 and extends upwardly therefrom. Standard bracket 58 is formed from hollow square tubing, and the inner dimensions of bracket 58 are commensurate with the outer dimensions of tubing section 56 for allowing the lower end of standard bracket 58 to nest over tubing section 56. Once base portions 54 are bolted to the vehicle, the lower ends of standard brackets can easily be slipped over tubing sections 56 to secure cross bar 22 to the vehicle body.

Telescoping upwardly from standard bracket 58 is a standard extension member 60. At least one surface of extension member 60 is preferably ruled with indicia 62 to indicate the distance by which extension member 60 has been extended from the upper end of bracket 58. The ability to raise and lower extension members 58 for each of support standards 50 and 52 provides the ability to raise cross bar 52 to an elevation that will be sufficient to clear windshields, wiper blade arms, or other obstructions. Moreover, the ruled markings 62 on extension members 60 assist the repairman in raising both ends of cross bar 22 to the same elevation in order to maintain cross bar 22 level with the horizontal. As shown in FIGS. 1, 6 and 8, a rotatable knob 64 is provided at the upper end of standard bracket 58 to releasably clamp extension member 60 at a desired elevation.

Secured to the upper end of extension member 60 is a sleeve or collar 66 made from a short section of hollow square tubing. The inner dimensions of collar 66 are commensurate with the outer dimensions of cross bar extension member 38 to allow collar 66 to slide over the end of extension member 38, as indicated in the sectional drawing of FIG. 7. A rotatable knob 68 is provided on collar 66 to clamp the end of extension member 38 within collar 66. As shown in FIG. 6, collar 66 preferably includes an opening 70 through which the ruled markings 40 printed on extension member 38 may be viewed. Ideally, the opening 70 is aligned with the central vertical axis of support standard 52, and the zero line marking 72 printed on extension member 38 is aligned with the center of opening 70; in this event, the ruled marking just adjacent end 28 of central member 24 will indicate the distance by which support standard 52 is spaced from second end 28 of central member 24.

Referring particularly to FIGS. 6 and 9, support standard 52 includes a pivot pin 74 extending vertically and directed upwardly from a horizontal support flange 76 extending from standard bracket 58. A vertical flange 78 is secured to both standard bracket 58 and support flange 76 for structural reinforcement. As indicated by vertical axis 80 in FIGS. 6 and 9, pivot pin 74 is vertically aligned with bolt hole 55 in base 54. A similar pivot pin 82 is provided in an identical manner on support standard 50, causing pivot pin 82 to be vertically aligned with bolt 46 (see FIG. 1). The purpose of pivot pins 74 and 82 will become more apparent below.

Referring again to FIG. 1, three tram bars are generally designated by reference numerals 84, 86, and 88. Each of these tram bars may be of different length for making different types of measurements, but apart from their length, tram bars 84, 86, and 88 are similarly constructed. Tram bar 86 consists of an outer bar 90 preferably made of hollow square tubing. A first end of outer bar 90 includes a universal coupling member 92 that is shown in greater detail in FIGS. 10 and 15. Universal coupling member 92 includes a yoke 94 through which a horizontal pin 96 passes for pivotally securing the end of outer tram bar member 90 to yoke 94 for allowing tram bar 86 to pivot upwardly and downwardly relative to yoke 94. A bubble level 95 is secured to outer tram bar 90 opposite universal coupling 92 to ensure that tram bar 86 is held level when any measurements are being made.

A hole 96 is formed within yoke 94 extending along vertical axis 98. Hole 96 is sized to be commensurate with central pivot pin 34 on cross bar 22, and commensurate with side pivot pins 74 and 82 on support standards 52 and 50, respectively. Accordingly, hole 96 is adapted to be releasably engaged over pivot pins 34, 74, and 82 for allowing tram bar 86 to swing from side to side about any of such pivot points. Moreover, when yoke 92 is engaged over pivot pin 74, hole 96 is vertically aligned with cowl bolt 48.

Tram bar 86 further includes an inner extension bar 100, the outer dimensions of which are commensurate with the inner dimensions of outer bar 86 for allowing extension bar 100 to be slidingly received within outer bar 90. Extension bar 100 can be telescoped out by a desired amount for measuring various points on the vehicle body. As shown in FIGS. 1, 2 and 5, a rotatable knob 102 is provided at the far end of outer tube 90 for releasably clamping extension member 100 at a desired amount of extension.

At the end of extension member 100 opposite clamp knob 102, a probe collar 104 is secured. Collar 104 is formed from a short section of hollow square tubing. Vertically-aligned holes are formed in the upper and lower faces of collar 104 for allowing a pointer or probe rod 106 to be slidingly extended therethrough. A further rotatable knob 108, shown in FIGS. 2 and 4, is provided on collar 104 to releasably clamp probe rod 106 at a desired height. As indicated in FIGS. 2 and 3, one end of probe rod 106 may include a tapered tip 110 for contacting various points on the vehicle body. As shown in FIGS. 1 and 2, indicia in the form of rule markings 112 are provided on extension member 100 and indicate the distance between pivot hole 96 in yoke 94 at the near end of tram bar 86 and probe rod 106 at the far end of tram bar 106. The overall length of tram bar 86 is indicated by the rule marking adjacent the end of outer bar 90.

As indicated above, one end of probe rod 106 may have a tapered tip 110. Alternate forms of probe rods are shown in FIGS. 12–14. In FIG. 12, the lower ends of three probe rods are shown, each provided with a cylindrical sleeve. Sleeve 114 is adapted to nest over a nut 116 secured to the vehicle body. Similarly, smaller cylindrical sleeves 118 and 120 are adapted to nest over bolts 122 and 124, respectively. In FIGS. 13 and 14, probe rod 106 has one end modified to include a slot or recess 126 in its outer surface. Recess 126 is useful for engaging the lip of a hole in the vehicle body, or for engaging the edge of a sheet metal portion 128 of the vehicle body. As indicated in FIG. 13, probe rod 106 can be directed upwardly to engage a hole or sheet metal edge when the tram bar is mounted below the vehicle body.

Tram bar 86 can be used separate from cross bar 22 as a conventional tram bar, if desired, to make simple point-to-point measurements. In this event, a hole 130 extending along vertical axis 132 may be formed in the upper and lower faces of outer bar 90 of tram bar 86 adjacent universal coupling 92. A second probe rod 134 may be extended through vertical hole 130 and clamped in place by rotatable knob 136, as shown in FIG. 11. Tram bar 86 can then be used as a conventional tram bar. However, because the ruled markings 112 on extension member 100 (see FIG. 2) are indexed relative to hole 96 of yoke 94 rather than to hole 130, it is necessary for the user to deduct from the indicated reading the offset distance between hole 130 and hole 96. This offset can be fixed at a convenient distance, for example, 100 millimeters, to simplify the task of deducting the offset from the indicated measurement. Like the probe rod 106 secured to the far end of tram bar 86, the probe rod 134 secured within hole 130 by clamp knob 136 may include a cylindrical sleeve for engaging the head of bolt 138. Similarly, probe rod 134 may include a recess 140 for engaging the edge of a hole or the edge of a sheet metal surface.

The operation of the measuring device will now be described. Assuming that measurements are to be made of underhood dimensions, as shown in FIG. 1, the base portions of support standards 50 and 52 are secured to the cowl bolts 46 and 48 in the manner already described. The distance between cowl bolts 46 and 48 is obtained, either from the specifications of the manufacturer of the vehicle, or by roughly measuring such distance directly. Extension members 36 and 38 are then extended from central bar 24 by equal amounts until cross bar 22 is approximately equal in length to the distance between cowl bolts 46 and 48. It is preferred that extension members 36 and 38 are already engaged with their respective locking collars 66 before cross bar 22 is placed on the vehicle; once the proper distance between support standards 50 and 52 is obtained by telescoping extension members 36 and 38, it is relatively easy to nest the support brackets over their respective square tubing sections 56 on bases 104.

Once cross bar 22 is supported upon the vehicle, the repairman must then ensure that pivot pin 34 of cross bar 22 is precisely centered between cowl bolts 46 and 48. Clamp knobs 42, 44 and 68 are loosened, and extension members 36 and 38 may then be moved as necessary to bring the zero marking in alignment with the center of hole 70 at each of collars 66, as shown in FIG. 6; clamp knobs 68 are then tightened. Central bar 24 is then moved slightly from side to side until the ruled markings at ends 26 and 28 of central bar 24 match each other, after which clamp knobs 42 and 44 are tightened. If necessary, support standard extension members are raised or lowered, as by loosening clamp knobs 64, in order to allow cross bar 22 to clear any obstructions, and to ensure that cross bar 22 is level in accordance with bubble level 30.

The repairman can easily confirm that center pivot pin 34 has been properly centered between cowl bolts 46 and 48. The universal coupling of the shortest tram bar 88 is secured over center pivot pin 34; the repairman then swings the probe end of tram bar 88 over toward side pivot pin 82 and adjusts the length of the tram bar until the tapered tip of the probe rod just touches side pivot pin 82, after which the length of tram bar 88 is clamped tight. The repairman then swings the probe end of tram bar 88 over toward opposite side pivot pin 74. Assuming that the center pivot pin is properly centered, the tapered tip of the probe rod should just touch side pivot pin 74; if not, then the repairman loosens clamp knobs 42 and 44 and adjusts the lateral position of central bar 24 until pivot pin 34 is centered.

After properly centering pivot pin 34, one or more of the tram bars 84, 86 and 88 may be engaged over pivot pin 34 to make comparative measurements between the center pivot pin 34 and any two symmetrically disposed reference points on the vehicle body. Because it is sometimes desired to simultaneously engage more than one tram bar over center pivot pin 34, it may be advantageous to make such pivot pin twice as tall as the thickness of each universal coupling 92. The shorter tram bar 88 may be secured over pivot pin 34 to measure the distance from pivot pin 34 to, for example, the right and left strut towers in the engine compartment. In this case, the tram bar clamp knob is loosened, and the length of tram bar 88 is adjusted until its probe rod rests atop the right strut tower; if necessary, the probe rod clamp knob is loosened, and the height of the probe rod is adjusted until the tram bar bubble level indicates that the tram bar is horizontal. After clamping the tram bar length and the probe rod height, the tram bar is swung over to the opposing left strut tower. If the vehicle body is in proper alignment, the tip of the probe rod should identically touch the left strut tower. If not, further pulls must be made on the vehicle body to return the vehicle body to proper alignment.

In a similar manner, tram bars 84, 86 and 88 can be engaged with center pivot pin 34 to test any pair of symmetrically disposed reference points on the vehicle body. For example, a tram bar of intermediate length can be used to probe the fender extensions in order to confirm that the front end of the vehicle is square. The measuring device of the present invention is useful for making comparative measurements directed to sidelamps, headlamps, and corners of the grill, for which manufacturers may not even provide specifications. Moreover, by selecting probe rods of sufficient length, the lower frame rails below the engine compartment can be probed; in such instances, the bubble level on the tram bar ensures that the tram bar is maintained horizontal, and that the probe rod is maintained vertical.

The longer tram bars can also be used in conjunction with side pivot pins 74 and 82 for making actual, or comparative, measurements diagonally across the engine compartment. For example, tram bar 86 can be engaged over side pivot pin 82 and swung diagonally across the engine compartment to probe reference points, such as bolts, located near the front end of the vehicle body on the opposite side of the vehicle body. The actual distance measured on the tram bar can be compared to manufacturer's specifications for the distance between the cowl bolt and the reference point. Alternatively, the tram bar length can be clamped, and the tram bar disengaged from side pivot pin 82, and moved to side pivot pin 74; the tram bar is then swung diagonally across the engine compartment in the opposite direction toward the corresponding reference point on the opposite side of the vehicle body. Assuming that the two reference points are symmetrically disposed and in proper alignment, the probe rod should just touch the corresponding reference point on the opposite side of the vehicle body.

Those skilled in the art will now appreciate that a simple and inexpensive measuring apparatus has been described for assisting a repairman in measuring any misalignment of a damaged vehicle body. The disclosed apparatus can be quickly secured to the vehicle, and quickly removed as needed. It will also be appreciated that the present invention provides an improved method of measuring misalignment of a damaged vehicle body. While the present invention has been described with respect to a preferred embodiment thereof, such description is for illustrative purposes only, and is not to be construed as limiting the scope of the invention. Various modifications and changes may be made to the described embodiment by those skilled in the art without departing from the true spirit and scope of the invention as defined by the appended claims.

I claim:

1. Apparatus for measuring distances along the body of a vehicle, the vehicle having a longitudinal axis, said apparatus comprising in combination:
   a. a cross bar adapted to extend laterally perpendicular to the longitudinal axis of the vehicle, said cross bar having first and second opposing ends and a center point midway between said first and second opposing ends;
   b. securing means for releasably securing said first and second opposing ends of said cross bar to opposing sides of the vehicle at first and second attachment points, respectively, of the vehicle body that are equidistant from the longitudinal axis of the vehicle body, the attachment points lying in an axis perpendicular to the longitudinal axis of the vehicle body;
   c. at least one tram bar having first and second opposing ends, the first end of said tram bar being pivotally secured to the center point of said cross bar, the second end of said tram bar including probe means for contacting various points along the vehicle body as said tram bar is pivoted about the center point of said cross bar;
   d. a first pivot point aligned with the vertical axis of said first attachment point and a second pivot point aligned with the vertical axis of said second attachment point, each of said first and second pivot points being adapted to releasably receive the first end of said tram bar.

2. The apparatus recited by claim 1 wherein said securing means includes first and second support standards each having a base for being bolted to the vehicle body, said first support standard including means for engaging the first end of said cross bar, and said second support standard including means for engaging the second end of said cross bar, and wherein said first and second pivot points extend from said first and second support standards, respectively.

3. The apparatus recited by claim 2 wherein the first end of said tram bar has an aperture formed therein, and wherein said first and second pivot points each include a pivot pin, the apertured first end of said tram bar being adapted to releasably engage one of the pivot pins for pivotally securing the first end of said tram bar to one of said first and second pivot points.

* * * * *